Aug. 16, 1966        R. G. JEWELL        3,266,324

SPRING SYSTEM FOR MEASURING INSTRUMENTS

Filed Dec. 27, 1963

INVENTOR.
RICHARD G. JEWELL
BY Richard E. Hosley
ATTORNEY

United States Patent Office 3,266,324
Patented August 16, 1966

3,266,324
SPRING SYSTEM FOR MEASURING INSTRUMENTS
Richard G. Jewell, Swampscott, Mass., assignor to General Electric Company, a corporation of New York
Filed Dec. 27, 1963, Ser. No. 333,838
3 Claims. (Cl. 73—432)

The present invention relates to measuring instruments and more particularly to measuring instruments of the force-displacement type.

In measuring instruments of the force-displacement type, an indicator or control element is displaced by an amount proportional to a quantity being measured. Usually the measured quantity is translated into a force or torque which displaces a movable element, such as a rotatable shaft, against the resisting force of suitable spring-biasing means. In order to obtain a linear output of the instrument, the spring-biasing means should develop a resisting force or torque which is proportional to displacement of the control element from a zero position. Coil springs are commonly used as the spring-biasing means in instruments of this type. The use of such springs, however, may give rise to instrument errors arising from changes in the physical properties of the coil springs with changes in temperature. One such error, known as zero shift, has heretofore been eliminated by the use of two oppositely wound coil springs coupled to the rotatable instrument shaft. However, the use of dual opposed coil springs does not eliminate another kind of temperature error caused by a change in the elasticity of the springs with temperature changes. Such a change of elasticity of the springs will adversely affect the linearity of the instrument unless some form of compensation is provided. Heretofore this second type of error has been eliminated or minimized in instruments subject to relatively low operating temperatures by the use of special spring materials the elasticity of which remains substantially constant over the operating range of temperatures. One such spring material is a nickel-iron-titanium alloy currently sold under the name "Ni Span-C." This material has the property of maintaining a constant modulus of elasticity over a useful temperature range of −50° F. to +150° F. This approach, however, does not solve the problem where the instrument is required to operate in a temperature range exceeding the constant elasticity limits of known spring materials, and hence for such applications the instruments may have substantial and undesirable temperature errors. One such high temperature application where temperature errors have been troublesome is in connection with mass flowmeters required to measure fuel flow at temperatures running above 300° F. Such instruments use springs biasing the flow-responsive element that are subjected to temperatures nearly as high as the temperature of the metered fuel.

Accordingly, it is an object of the present invention to provide a measuring instrument of the force-displacement type utilizing biasing springs which operates accurately over higher operating temperatures than has been possible heretofore.

Another object of the invention is to provide such an instrument which does not require the use of isoelastic spring materials whereby the temperature limitations inherent in the use of such materials are avoided.

Further objects and advantages of the invention will become apparent as the following description proceeds.

Briefly, in accordance with my invention, I provide a measuring instrument of the force-displacement type utilizing opposed coil springs formed of common spring materials having a negative temperature coefficient of elasticity. In order to compensate for the tendency of these springs to lose stiffness with temperature increase due to a decrease in the modulus of elasticity, I form the coils of laminated strips having different temperature coefficients of expansion. The laminated strips are bonded so that they have a flat cross section at or below the low temperature limit of operation of the instrument. For higher temperatures the laminated strips warp progressively and thereby increase the stiffness of the coil springs. By proper selection of the ratio of width to thickness of the laminated spring strips, the opposing effects of decreasing stiffness due to a change in modulus of elasticity and the increase in stiffness due to warping of the coils may be made to cancel out thereby rendering the instrument relatively insensitive to temperature changes over a wide range of operation.

For a better understanding of the invention, reference should be made to the following detailed description taken in connection with the accompanying drawings in which.

Figure 1:
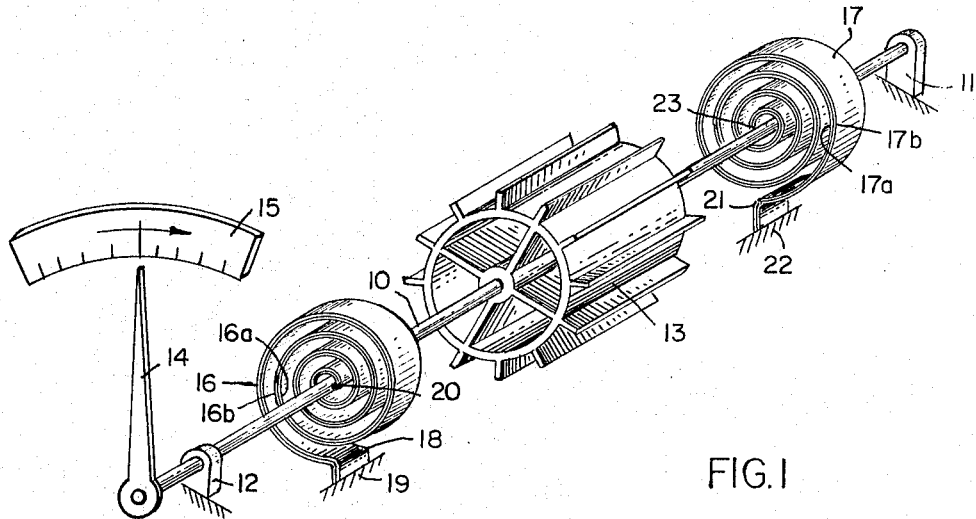
FIGURE 1 is a schematic perspective view of a measuring instrument utilizing compensated biasing springs constructed in accordance with the invention.

Referring now to FIGURE 1 of the drawing, there is shown in schematic form a measuring instrument of the force-displacement type utilizing temperature-compensated biasing springs constructed in accordance with the invention. The instrument is shown as comprising a shaft 10 rotatably supported in suitable instrument bearings 11 and 12. At the center of the shaft is a torque element 13 which applies to the shaft a torque proportional to a quantity being measured. The torque element may, for example, be the turbine of a well-known type of mass flowmeter shown in Jennings Patent No. 2,714,310 wherein the rotatable turbine, represented schematically by the torque element 13, is subjected to a torque variable in accordance with the mass flow rate of fluid flowing through the flowmeter. It should be understood, however, that the subject invention is also applicable to other types of measuring instruments of the force-displacement type, and the torque element 13 could, for example, be the rotor of a d'Arsonval-type electrical measuring instrument.

Attached to the shaft 10 for rotation therewith is a pointer 14 rotating relative to a fixed scale 15 to function as an indicator of a quantity, such as mass flow rate, being measured. Alternatively, the shaft may be coupled to a suitable transducer of known construction used for the purpose of actuating remotely located indicators or control devices, not shown.

In instruments of this type, it is desirable to connect a biasing means to the rotating shaft 10 resisting rotation by the torque element 13 with a force proportional to rotary displacement of the shaft. For this purpose there is provided a spring-biasing means comprising a pair of oppositely wound spiral coil springs 16 and 17. The spring 16 has an outer end 18 anchored to a fixed support 19 and an inner end 20 secured to the shaft 10 on one side of the torque element 13. The spring 17, which is identical to the spring 16 except for the direction of winding, similarly has an outer end 21 secured to a fixed support 22 and an inner end 23 coupled to the shaft 10 on the opposite side of the torque element 13 from the spring 16. It will be understood that the springs lie in a plane perpendicular to the shaft.

The springs 16 and 17 are formed of bonded, laminated strips, the construction of which may resemble that used in bimetal thermostats having spiral configurations. Thus, the two laminated strips 16a and 16b of the spring 16 are formed of materials, preferably metals, having different temperature coefficients of expansion. The construction of spring 17 having laminated strips 17a and 17b is similar.

As is well known, bimetallic coils such as the springs 16 and 17 tend to coil and uncoil with changes in temperature. This coiling and uncoiling effect, which would be undesirable in an instrument of the type here involved, is cancelled out by the use of two identical springs wound in opposite directions and coupled to the shaft 10. Thus, this construction prevents an undesired temperature error known as "zero shift" which is a change in the zero point of the instrument with changes in ambient temperature.

Temperature changes of the springs 16 and 17 produce another force which is utilized advantageously by this invention. That force arises from differential expansion of the laminated strips of the springs in a transverse direction.

Figure 2:
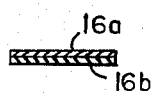
FIGURE 2 is a cross-section view of one of the springs showing its flat configuration at or near the low temperature limit of operation of the instrument.
Figure 3:
FIGURE 3 is similar to FIGURE 2 but showing the warped configuration of the spring cross section at a higher temperature of operation of the instrument.

Referring now to FIGURES 2 and 3 of the drawing, there is shown a cross-sectional view of spring 16 showing the laminated strips 16a and 16b of which the springs are formed. The laminated strips of the springs are bonded, as by welding, while they are in a flat position at a temperature at or below the lower end of the temperature range of operation of the instrument. This condition is illustrated in FIGURE 2. When the temperature of the springs increases, the differential expansion of the laminations 16a and 16b causes a warping or cupping of the strips in a transverse direction as illustrated in FIGURE 3. In thermostats this warping of the bimetallic strips is considered disadvantageous, and attempts are made to minimize it because the warping increases the bending stresses in a crosswise direction of the strip, which increases its stiffness in the direction of coiling or uncoiling of the spiral and thereby introduces a temperature error in the instrument. In the present invention this effect is utilized advantageously to compensate or counteract a temperature error which would otherwise arise from a decrease in the modulus of elasticity of the spring material with increases in temperature. The manner in which this compensation is obtained can best be explained by the graphical representation shown in FIGURE 4 of the drawing to which reference will now be made.

Figure 4:
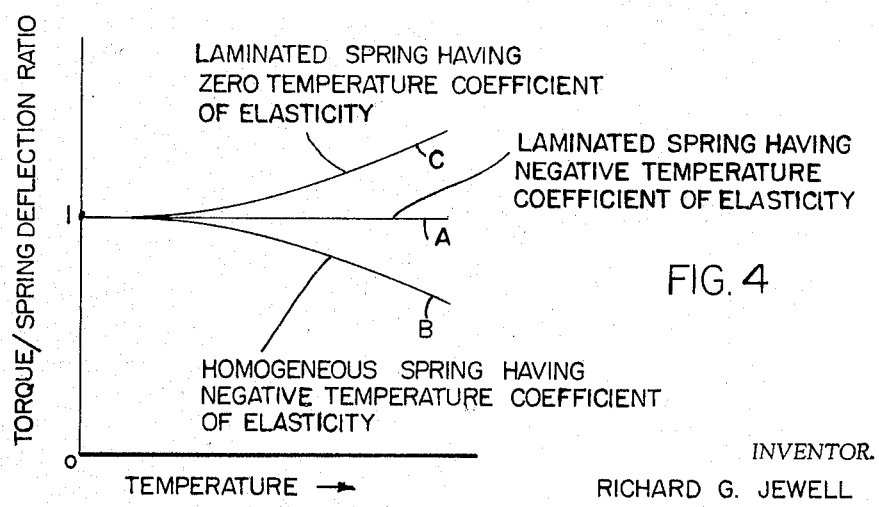
FIGURE 4 is a graphical representation useful in explaining the operation of the invention.

In FIGURE 4 the curve A shows the desired relationship between the torque deflection ratio of the springs 16 and 17 and the ambient temperature of the instrument which is considered to be the same as the temperature of the springs. As shown, this ratio remains constant, which is desirable, to obtain a linear response of the instrument free from temperature error.

If the springs were constructed of a homogeneous spring material having a negative coefficient of elasticity as most materials have, the ratio would decrease with an increase in temperature due to loss in stiffness, i.e., decrease in the modulus of elasticity with an increase in temperature. This condition, represented by the curve B, would cause a temperature error in the instrument.

For purposes of explanation, curve C shows the ratio if the springs were laminated, as shown, but formed of an isoelastic material to eliminate the effect shown by curve B. The term "isoelastic material" as used herein means a material having a zero temperature coefficient of elasticity. Here the ratio increases with temperature increase due to an increase in the stiffness of the springs caused by progressive warping or cupping of the springs in a transverse direction as shown in FIGURE 3. This would also cause temperature error of the instrument due to the nonlinear spring response.

According to the invention, the springs are formed of laminated materials having different coefficients of expansion but having a negative coefficient of modulus of elasticity. By proper selection of the width-to-thickness ratio of the springs, the two opposing effects of decrease in stiffness, due to decrease in the modulus of elasticity and increase in stiffness due to warping, may be made to cancel out thus giving the desired torque deflection ratio shown by the curve A.

Because an instrument with biasing springs constructed in the manner above described does not require the use of isoelastic materials, the operating temperature range of the instrument is not limited by the relatively low temperature range of such materials and can be extended to cover much higher temperatures than have heretofore been possible without incurring serious instrument errors due to changes in the elasticity of the biasing springs with temperature.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. A measuring instrument comprising a shaft,
means for applying a measurement torque to said shaft variable in accordance with a quantity to be measured,
spring means coupled to said shaft providing a torque resisting said measurement torque variable as a function of displacement of said shaft,
and indicator means coupled to said shaft,
said spring means comprising a pair of oppositely wound coils, arranged to produce torques on said shaft in opposite directions, each fastened to said shaft at one end and having the other end secured to a stationary support,
said coils being formed of bonded materials having negative temperature coefficients of elasticity and different temperature coefficients of expansion whereby a tendency of said coils to progressively decrease in stiffness with an increase in coil temperature due to a reduction of the modulus of elasticity of said materials is compensated by a progressive increase in the stiffness of said coils with said coil temperature increase due to warping of the coils caused by differential expansion of said materials so that the resisting torque provided by said spring means is relatively insensitive to temperature changes over an extended temperature range of operation of said instrument.

2. In a measuring instrument having a range of operating temperature above a low temperature limit,
a rotatable shaft to which a measurement torque is applied to cause rotation of said shaft,
an indicator actuated by rotation of said shaft, and
displaceable spring means resisting rotation of said shaft, said spring means comprising:
a pair of oppositely wound coils, arranged to produce torques on said shaft in opposite directions, each coil being fastened to said shaft at one end and having the other end secured to a stationary support and each coil comprising a plurality of laminations, the laminations of each coil being formed of materials having negative temperature coefficients of elasticity and different temperature coefficients of expansion and the laminations of each coil being bonded so as to have a flat cross section at or below said low temperature limit and to warp progressively at temperatures above said low temperature limit due to differential expansion of said laminations whereby a tendency of said coils to progressively decrease in stiffness with an increase in temperature within said range due to a reduction of the modulus of elasticity of said lamination materials is compensated by a corresponding increase in stiffness of said coils due to warping so that the torque-displacement characteristic of said spring means remains approximately linear over the operating temperature range of said instrument.

3. In a measuring instrument
a rotatable shaft,
means for applying a torque to said shaft proportional to a quantity to be measured,
spring means coupled to said shaft having an approximately linear torque-deflection characteristic over an extended temperature range of operation of said instrument, said spring means comprising a pair of oppositely wound bonded, laminated coils having different coefficients of expansion arranged to produce torques on said shaft in opposite directions and said coils having a thickness to width ratio selected to compensate for temperature-induced changes in the modulus of elasticity of the laminated spring coils.

References Cited by the Examiner

UNITED STATES PATENTS

| | | | |
|---|---|---|---|
| 1,544,342 | 6/1925 | Phelan | 73—363.9 |
| 2,213,339 | 9/1940 | Downing | 324—106 |
| 2,225,941 | 12/1940 | Hall | 73—363.7 X |

RICHARD C. QUEISSER, *Primary Examiner.*

DAVID SCHONBERG, *Examiner.*

J. W. MYRACLE, *Assistant Examiner.*